US008145893B2

(12) United States Patent
    Narayanan

(10) Patent No.: US 8,145,893 B2
(45) Date of Patent: Mar. 27, 2012

(54) HOT-PLUGGING A MEMORY DEVICE

(75) Inventor: Vimal V. Narayanan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 12/257,121

(22) Filed: Oct. 23, 2008

(65) Prior Publication Data
    US 2009/0119498 A1    May 7, 2009

(30) Foreign Application Priority Data
    Oct. 26, 2007    (IN) ............................ 2239/DEL/2007

(51) Int. Cl.
    *G06F 9/00*    (2006.01)
    *G06F 9/24*    (2006.01)
    *G06F 15/177*    (2006.01)
    *G06F 13/00*    (2006.01)

(52) U.S. Cl. ................. 713/2; 713/1; 713/100; 711/170
(58) Field of Classification Search ........................ None
    See application file for complete search history.

(56) References Cited

U.S. PATENT DOCUMENTS

| 6,704,840 | B2 * | 3/2004 | Nalawadi et al. | 711/118 |
| 2005/0216721 | A1 * | 9/2005 | Zimmer et al. | 713/2 |
| 2007/0055856 | A1 * | 3/2007 | Zimmer et al. | 713/2 |
| 2008/0005549 | A1 * | 1/2008 | Ke | 713/1 |
| 2008/0244250 | A1 * | 10/2008 | Swanson et al. | 713/1 |

* cited by examiner

*Primary Examiner* — Ji H Bae
(74) *Attorney, Agent, or Firm* — Blakely, Sokoloff, Taylor & Zafman LLP

(57) ABSTRACT

An extensible firmware interface (EFI) framework is to enable hot-plugging and hot-removal of memory devices. The security phase of the EFI may enable a cache to operate as RAM (CAR mode) to support execution of pre-EFI (PEI) tasks. In one embodiment, the PEI phase may move the memory reference code (MRC) as a driver to the driver execution phase and hand-over the CAR information to the driver execution environment (DXE). The MRC driver may be registered as a run-time API, which may be called by the operating system to receive a dynamically created memory map. In other embodiment, the PEI phase executes the MRC and may hand-over the memory information and a memory pointer to the MRC to the DXE. The OS may call the DMD driver provisioned in the DXE, which in turn may call the MRC provisioned in the PEI to dynamically create a memory map.

20 Claims, 4 Drawing Sheets

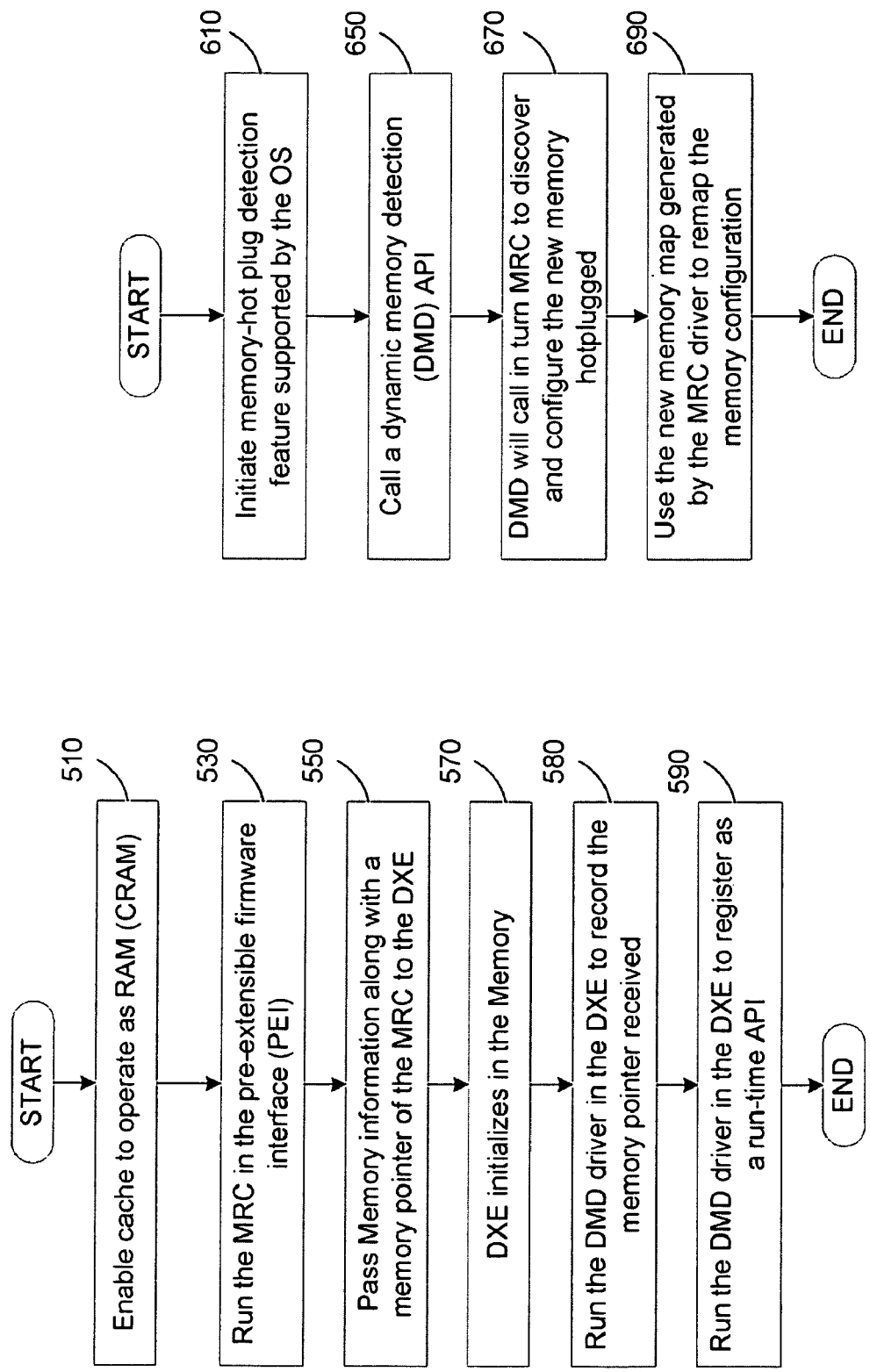

HOT-PLUGGING A MEMORY DEVICE

This application claims priority to Indian Patent Application Number 2239/DEL/2007, titled "HOT-PLUGGING A MEMORY DEVICE", filed Oct. 26, 2007.

BACKGROUND

A computer system may be booted-up by a basic input-output system (BIOS) during a power ON or restart phase. As a part of the boot process, the BIOS uses a memory reference code (MRC) to detect and configure a main memory in the computer system. A memory reference code generates a memory map of one or more memory devices coupled to the computer system. The BIOS may run the MRC once during each boot process and the memory map may not change until the computer system is booted-up again.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 illustrates an embodiment of a boot-up phase operation the computer system 400, which may support hot-plugging of a memory device.

FIG. 6 illustrates an embodiment of a run-time phase operation the computer system 400, which may support hot-plugging of a memory device.

DETAILED DESCRIPTION

The following description describes hot-plugging a memory device. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
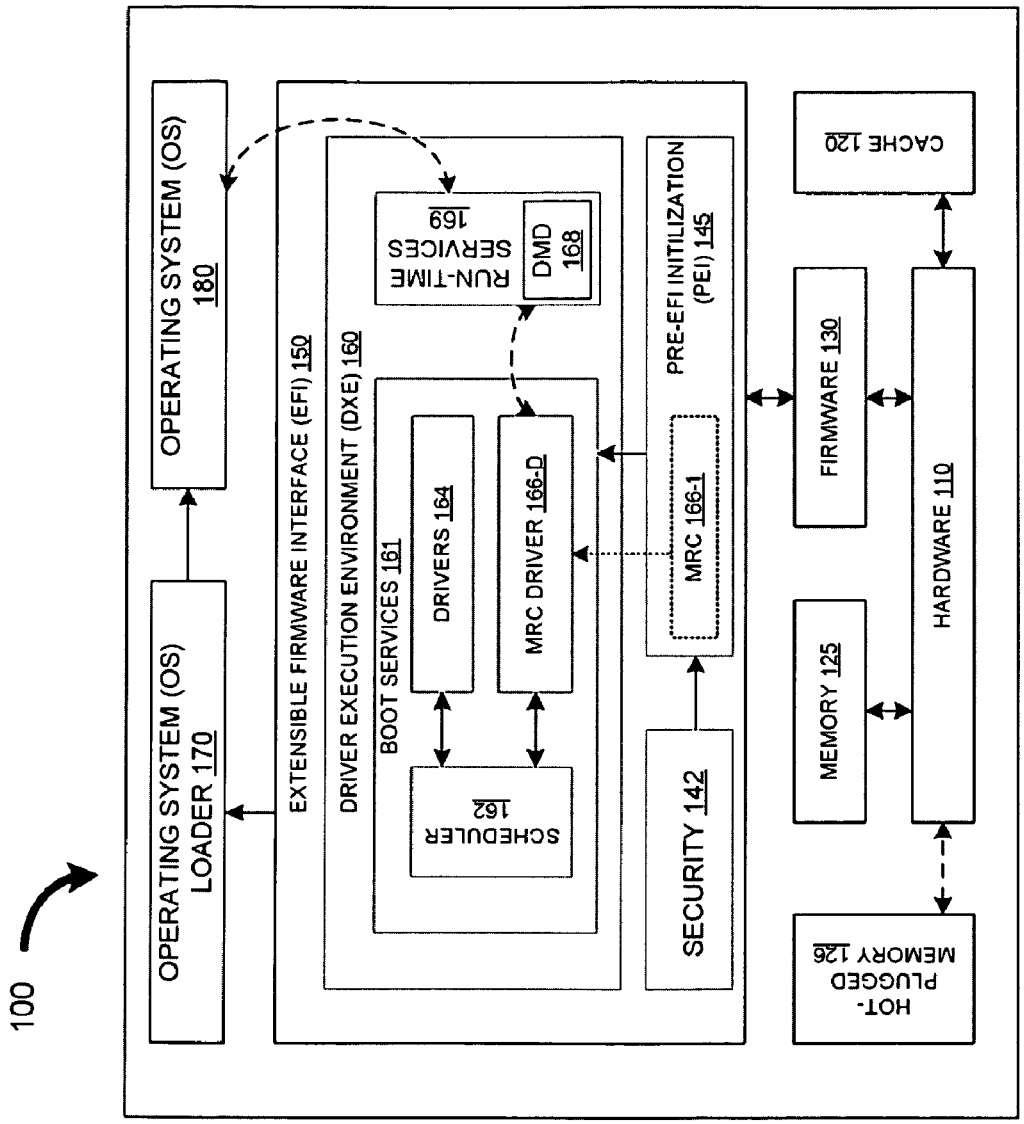
FIG. 1 illustrates an embodiment of a computer system 100, which may support hot-plugging of a memory device.

An embodiment of a computer system 100, which may support hot-plugging of memory devices is illustrated in FIG. 1. In one embodiment, the computer system 100 may comprise a hardware 110, a cache 120, a main memory 125, a hot-plug memory 126, a firmware 130, an extensible firmware interface (EFI) 150, an OS loader 170, and an operating system 180.

In one embodiment, the hardware 110 may comprise a processor, a chipset, BIOS integrated circuit, and similar other components. In one embodiment, such a processor may be coupled to the cache 120. Also, the hardware 110 may be coupled to the firmware 130. In one embodiment, the chipset may comprise a memory controller hub and an I/O controller hub. In one embodiment, the main memory 125 may be coupled to the memory controller hub. In one embodiment, the main memory 125 may support the operating system (OS) 180. In one embodiment, the hot-plug memory 126 may be plugged into the computer system 100 after the computer system 100 is booted-up.

In one embodiment, the cache 120 may comprise fast memory, which may support higher access speeds. In one embodiment, the cache 120 may comprise a SRAM memory. In one embodiment, the cache 120 may support the extensible firmware interface (EFI) 150. In one embodiment, the size of the cache 120 may be chosen to support the firmware 130 and the EFI 150 during the boot-up phase. In one embodiment, the size of the cache 120 may equal 1 MB.

In one embodiment, the firmware 130 may comprise read only memory (ROM) such as programmable ROM, electrically programmable ROM, and such other similar devices. The firmware 130 may support components such as an extensible firmware interface (EFI) BIOS, legacy BIOS, a system abstraction layer, and a hardware abstraction layer. The components of the firmware 130 may perform functions such as machine check abort handling and other processor functions, which may be dependent on the characteristics of the hardware 110. In one embodiment, the firmware 130 may be coupled to the extensible firmware interface (EFI) 150.

In one embodiment, the EFI operating system (EFI-OS) loader 170 may load the installed operating system such as the operating system 180 in response to receiving a load signal from the EFI 150. In one embodiment, the EFI-OS loader 170 may represent a last EFI application before the EFI phase is complete.

In one embodiment, the operating system 180 may comprise processes that manage the allocation of resources of the computer system 100. In one embodiment, the operating system 180 may comprise Windows® XP, Linux, Unix®, MacOS® operating systems. Typically, after the completion of the boot-up phase, the OS 180 may receive the memory map from the firmware 130. The memory map does not change thereafter until the computer system 100 is re-booted as the memory reference code (MRC) does not run again to detect the change in the memory. As a result, the OS 180 may not recognize memory devices that may be hot plugged. To recognize the hot-plugged memory devices, the computer system 100 may be re-booted and the BIOS may generate a new memory map comprising the memory information the hot-plugged memory device. However, re-booting the computer system 100 may consume processing cycles as the BIOS is to be re-run and the OS and the applications is to be reloaded. Such an approach may also consume time, may not allow the physical memory to be increased or replace a non-functional memory without re-booting the computer system 100.

In one embodiment, the operating system 180 may comprise a command, or an application, or a hardware interrupt to initiate memory hot-plugging. In one embodiment, memory hot-plugging may refer to plugging-in the memory device such as the hot-plug memory 126, while the computer system 100 is ON or running. In one embodiment, the operating system 180 may initiate a task to allow highest access grant and may call memory reference code (MRC) registered as a runtime application programming interface (API), discover hot-plug memory 126, and re-calculate the memory map. In one embodiment, the operating system 180 may receive a memory table in response to calling the MRC runtime API.

In one embodiment, the memory table may comprise a list of memory devices such as the main memory 125 detected during the boot-up and a list of memory devices such as the hot-plug memory 126, which may be hot-plugged. In one embodiment, the operating system 180 may use the list of hot-plugged memory devices in the memory table to re-map the memory configuration. In one embodiment, the re-mapping of the memory configuration may enable the operating system 180 to detect the hot-plugged and hot-removed memory devices, without having to re-boot the computer system 100.

In one embodiment, the extensible firmware interface (EFI) framework 150 may provide an interface between the firmware 130 and the operating system 180. In one embodiment, the EFI 150 may support modular approach and may use high-level languages such as the C programming language. As a result, the EFI 150 may provide a scalable, flexible, and hardware independent approach to boot the computer system 100. In one embodiment, the EFI 150 may operate in three different phases such as a security phase, a pre-EFI initialization (PEI) phase, and a driver execution environment (DXE) phase.

Figure 2:
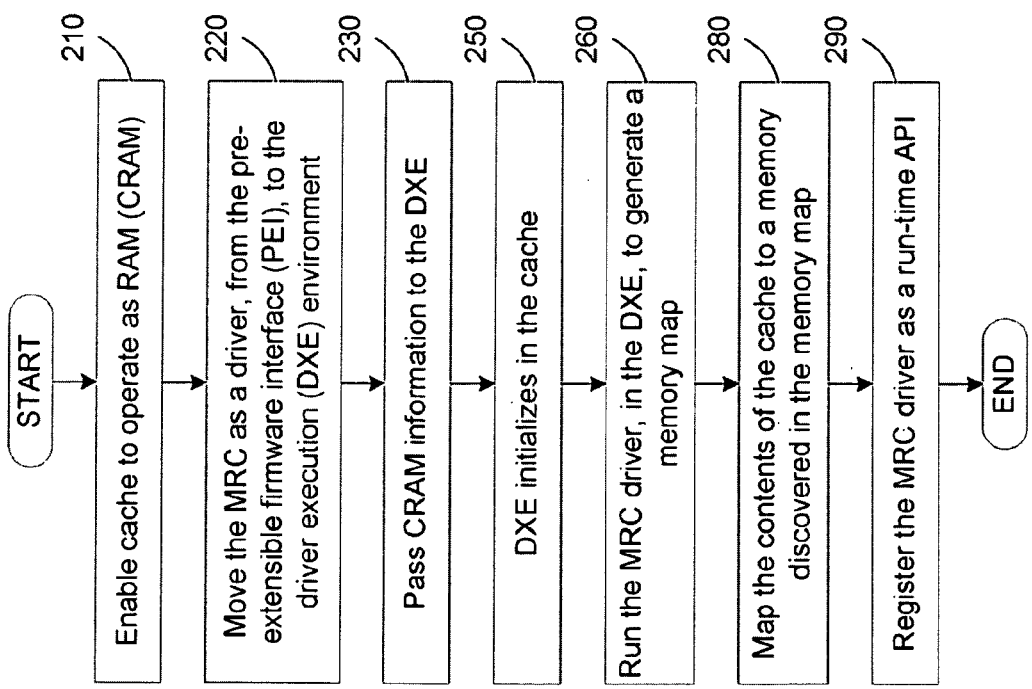
FIG. 2 illustrates an embodiment of a boot-up phase operation the computer system 100 in a boot-up phase to support hot-plugging of a memory device.

An embodiment of the computer system 100 operating in a boot-phase to enable hot-plugging of memory is illustrated in FIG. 2. In block 210, the security block 142 while in the security phase, may enable the cache 120 to operate as RAM (cache as RAM (CAR) mode). In one embodiment, the security block 142 may enable a large portion (e.g., 1-2 MB) of the cache 120 as RAM for supporting execution of PEI operations.

In block 220, the PEI 145 may move the MRC 166-1 as a driver (MRC driver 166-D) to the driver execution environment (DXE) 180. In one embodiment, the operation of cache 120 in CRAM mode may enable the MRC 166 to be moved as the MRC driver 166-D.

In block 230, the PEI 145 may pass the CAR information to the DXE 160. In one embodiment, the CAR information may comprise, the address range of the region of the cache 120 that may be available for the DXE 160 and may also comprise the address range of the region of the cache 120 used by the PEI 145. In one embodiment, the PEI 145 may pass the CAR information as a hand-off-block (HOB) list to the DXE 160.

In block 250, the DXE 160 may initialize the DXE components such as the boot-services 161 on the cache 120. In one embodiment, the DXE 160 may initialize the mandatory drivers on the cache 120. In one embodiment, the boot services 161 may comprise a scheduler 162, drivers 164, and the MRC driver 166-D.

In block 260, the boot services 161 may run the MRC driver 166-D. In one embodiment, the scheduler 162 may execute the MRC driver 166-D as the first driver. In one embodiment, the execution of the MRC driver 166-D may be set as a dependency for the execution of the drivers 164. In one embodiment, the scheduler 162 may initiate execution of the MRC driver 166-D before executing the other mandatory drivers of the drivers 164.

In one embodiment, the MRC driver 166-D may discover the memory devices coupled to the computer system 100. In one embodiment, the available memory devices may comprise memory devices such as the main memory 125 coupled to the computer system 100 before the boot-up phase.

In block 280, the boot services 161 may execute the drivers 164 to re-map the stack, variables, public data, and such other similar data stored in the cache 120 to the discovered memory such as the main memory 125.

In block 290, the boot services 161 may register the MRC driver 166-D as a run-time application programming interface (API). In one embodiment, the run-time services 169 may comprise a dynamic memory detection (DMD) block 168. In one embodiment, the MRC driver 166-D may be registered as a run-time API with the DMD block 168 of the run-time services 169.

In one embodiment, after registering the MRC driver 166-D as a run-time API, the drivers 164 may execute Exit-BootServices( ) command to terminate the boot services phase. After termination of the boot services phase, the boot services 161 may become unavailable to the OS 180.

Figure 3:
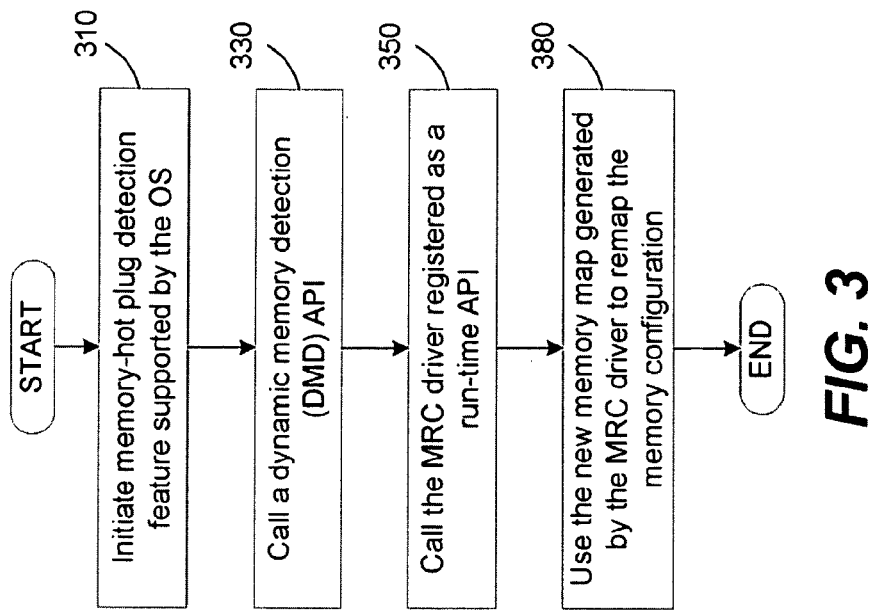
FIG. 3 illustrates an embodiment of a run-time phase operation the computer system 100, which may support hot-plugging of a memory device.

An embodiment of the computer system 100 operating in a run-time phase, which detects hot-plugging of a memory, is illustrated in FIG. 3.

In block 310, the operating system 180 may initiate memory hot-plug detection feature. In one embodiment, the hot-plugged memory 126 may be plugged into the computer system 100 after the boot-up phase is completed. In one embodiment, the OS 180 may comprise a command, or an application, or a hardware interrupt to initiate memory hot-plugging.

In block 330, the operating system 180 may call dynamic memory detection (DMD) API. In one embodiment, the DMD API may be supported by the run-time services 169.

In block 350, the dynamic memory detection (DMD) API supported by the run-time services 169 may call the MRC driver 166-D, which may be registered as a run-time API. In one embodiment, in response to being called by the DMD API, the MRC driver 166-D may generate a new memory map, which may comprise the memory map of the hot plugged memory 126.

In one embodiment, the MRC driver 166-D may comprise a flag to indicate the boot-time and run-time portions of the code. In one embodiment, the MRC driver 166-D may skip boot-time portion of the code and execute the run-time portion of the code to recognize the memory devices that are hot-plugged or hot-removed. In one embodiment, the MRC 166 may comprise a list of memory devices detected during the boot-up phase and a list of memory devices hot plugged or hot-removed.

In one embodiment, the MRC driver 166-D may create a GCD memory table, or E820 table, or may use an advanced configuration power interface (ACPI) driver to create a memory table. In one embodiment, the GD memory table may be generated if the OS 180 is an EFI aware OS. In one embodiment, the E820 memory table may be generated by a legacy OS. In one embodiment, the run-time services 169 may provide a dynamically updated new memory map to the EFI-OS loader 170. In one embodiment, GCD memory table/E820 memory table may be loaded to the OS 180 by the EFI OS loader 170. In one embodiment, after remapping, the MRC driver 166-D and the drivers 164 may reside in a reserved memory area, which is not used by the operating system 180.

In block 380, the operating system 180 may use the memory map generated by the MRC driver 166-D to remap the memory configuration.

Figure 4:
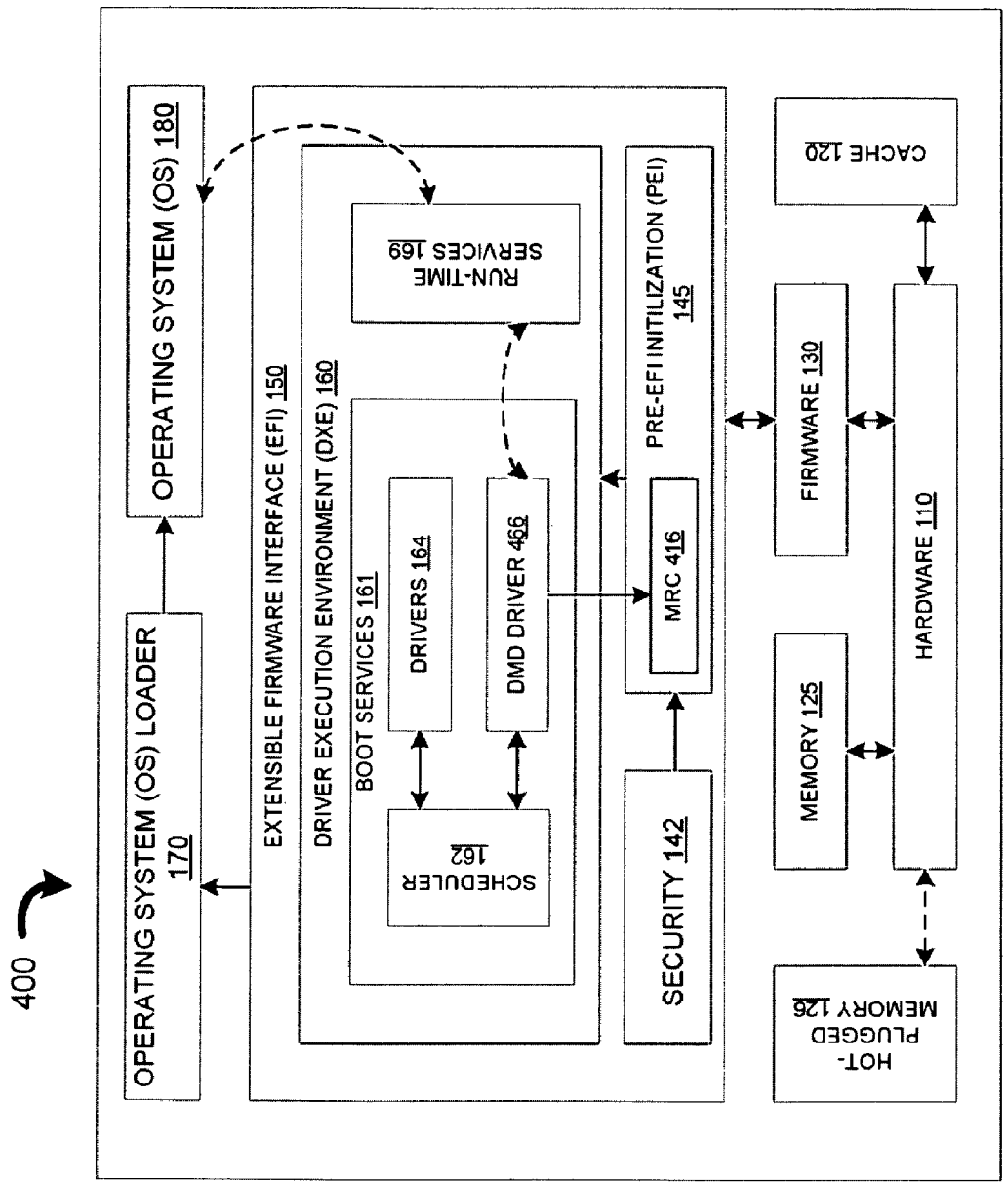
FIG. 4 illustrates an embodiment of a computer system 400, which may support hot-plugging of a memory device.

An embodiment of a computer system 400 supporting hot-plugging of memory device is illustrated in FIG. 4. The differences between the embodiment of the computer system 100 of FIG. 1 and the computer system 400 of FIG. 4 are described below. In one embodiment, during the PEI phase, the PEI 145 may execute the MRC 416 as compared to moving the MRC 166 from the PEI 145 to the DXE 160 in FIG. 1. In one embodiment, the memory information detected by the MRC 416 and a memory pointer to the MRC 416 may be passed to dynamic memory detection (DMD) block 466 of the DXE 160. In one embodiment, during the boot-up phase, the dynamic memory detection (DMD) 466 may be registered as a run-time API with the run-time services 169.

An embodiment of the computer system 400 operating during the boot-up phase is described in FIG. 5. In block 510, the security block 142 while in the security phase, may enable the cache 120 to operate as RAM (cache as RAM (CAR) mode). In one embodiment, the security block 142 may enable a large portion (e.g., 1-2 MB) of the cache 120 to operate as RAM for supporting execution of PEI operations.

In block 530, the PEI 145 may execute the MRC 416. A memory map may be generated by executing the MRC 416. In one embodiment, the memory map may comprise a map of the main memory 125.

In block 550, the PEI 145 may pass the memory information of the main memory 125 and a memory pointer of the MRC 416 to the DXE 160. In one embodiment, the memory information may comprise, the address range of a region in the main memory 125 that may be available for the DXE 160 and may also comprise the address range of a region of the main memory 125 used by the PEI 145. In one embodiment, the PEI 145 may pass the memory information and the memory pointer as a hand-off-block (HOB) list to the DXE 160.

In block 570, the DXE 160 may initialize the DXE components such as the boot-services 161 in the main memory 125. In one embodiment, the DXE 160 may initialize the mandatory drivers in the main memory 125. In one embodiment, the boot services 161 may comprise a scheduler 162, drivers 164, and the DMD driver 466.

In block 580, the DMD driver 466 may record the memory pointer, which may be used to call the MRC 416.

In block 590, the boot services 161 may run the DMD driver 466 to register the DMD 466 as a run-time API. In one embodiment, the scheduler 162 may execute the DMD driver 466 as the first driver. In one embodiment, the execution of the DMD driver 466 may be set as a dependency for the execution of the drivers 164. In one embodiment, the scheduler 162 may initiate execution of the DMD driver 466 before executing the other mandatory drivers of the drivers 164. In one embodiment, on being called, the DMD driver 466 may call the MRC 416, which may discover the memory devices coupled to the computer system 400.

An embodiment of the computer system 400 operating in a run-time phase, which detects hot-plugging of a memory, is illustrated in FIG. 6.

In block 610, the operating system 180 may initiate memory hot-plug detection feature. In one embodiment, the hot-plugged memory 126 may be plugged into the computer system 400 after the boot-up phase is completed. In one embodiment, the OS 180 may comprise a command, or an application, or a hardware interrupt to initiate memory hot-plugging.

In block 650, the operating system 180 may call dynamic memory detection (DMD) API. In one embodiment, the DMD driver 466, which may be registered as an API with the run-time services 169 may be supported by the DXE 160. In one embodiment, the run-time services 169 may call the DMD driver 466 in response to receiving a call from the OS 180.

In block 670, the DMD driver 466 may call the MRC 166 resident in the PEI 145. In one embodiment, in response to being called by the DMD driver 466, the MRC 416 may generate a new memory map, which may comprise the memory map of the hot-plug memory 126. In one embodiment, the MRC 416 may create a GCD memory table, or E820 table, or may use an advanced configuration power interface (ACPI) driver to create a memory table. In one embodiment, the GD memory table may be generated if the OS 180 is an EFI aware OS. In one embodiment, the E820 memory table may be generated by a legacy OS. In one embodiment) the run-time services 169 may provide a dynamically updated new memory map to the EFI-OS loader 170.

In block 690, the operating system 180 may use the memory map generated by the MRC 416 to remap the memory configuration.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   providing a memory reference code as a memory reference code driver,
   executing the memory reference code driver in a cache after receiving information of the cache, wherein executing the memory reference code driver in the cache discovers a memory,
   mapping contents of the cache to the memory,
   registering the memory reference code driver as a run-time application programmable interface, and executing the memory reference code driver in response to initiating a memory detection feature, wherein executing the memory reference code driver recognizes a hot-plugged memory.

2. The method of claim 1, wherein the cache is used as a random access memory to support execution of the memory reference code driver in the cache during a boot-up phase.

3. The method of claim 1, wherein the information of the cache is provided as a hand-off-block list during a boot-up phase, wherein the information of the cache comprises an address range within which the memory reference code driver is executed.

4. The method of claim 1, wherein initiating a memory detection feature initiates a dynamic memory detection driver in a run-time phase, wherein the dynamic memory detection driver is to cause execution of the memory reference code driver in the memory.

5. The method of claim 4, wherein the execution of the memory reference code driver in the run-time phase generates a new memory map, wherein the new memory map comprises a map of the hot-plugged memory.

6. A method comprising:
executing a memory reference code to discover a memory,
providing information of the memory and a pointer to the memory reference code,
mapping contents of a cache to the memory,
registering a dynamic memory detection driver as a run-time application programmable interface, and
executing the memory reference code in response to initiating a memory detection feature, wherein executing the memory reference code driver recognizes a hot-plugged memory.

7. The method of claim 6, wherein the cache is used as a random access memory to support executing the memory reference code in the cache during a boot-up phase.

8. The method of claim 7, wherein the information of the memory and the pointer to the memory reference code is provided as a hand-off-block list during the boot-up phase.

9. The method of claim 6, wherein initiating the memory detection feature initiates a dynamic memory detection driver in a run-time phase, wherein the dynamic memory detection driver is to cause execution of the memory reference code in the memory.

10. The method of claim 9, wherein the execution of the memory reference code in the run-time phase generates a new memory map, wherein the new memory map comprises a map of the hot-plugged memory.

11. A system comprising:
a cache coupled to a hardware unit,
a memory coupled to the hardware unit, and
a firmware supported by the hardware unit, wherein the firmware is to support a memory reference code driver,
wherein the firmware is to cause execution of the memory reference code driver in the cache to discover the memory and map contents of the cache to the memory after the memory is discovered,
wherein the firmware is to register the memory reference code driver as a run-time application programmable interface, and
wherein the firmware is to execute the memory reference code driver in response to an operating system initiating a memory detection feature, wherein executing the memory reference code driver recognizes a hot-plugged memory.

12. The system of claim 11, wherein the firmware is to configure the cache as a random access memory, wherein the cache as random access memory is to support execution of the memory reference code driver during a boot-up phase.

13. The system of claim 11, wherein a pre-extensible interface phase of the firmware is to provide information of the cache as a hand-off-block list, wherein the hand-off-block list is provided to a driver execution phase.

14. The system of claim 11, wherein the operating system is to initiate a memory detection feature, wherein the initiation of the memory detection feature is to initiate a dynamic memory detection driver in a run-time phase, wherein the dynamic memory detection driver is to cause execution of the memory reference code driver in the memory.

15. The system of claim 14, wherein the execution of the memory reference code driver in the run-time phase generates a new memory map, wherein the new memory map comprises a map of the hot-plugged memory.

16. A system comprising:
a cache coupled to a hardware unit,
a memory coupled to the hardware unit, and
a firmware supported by the hardware unit, wherein the firmware is to cause execution of a memory reference code in the cache to discover a memory and provide information of the memory and a pointer to the memory reference code,
wherein the firmware is to map contents of the cache to the memory,
wherein the firmware is to register a dynamic memory detection driver as a run-time application programmable interface, and
wherein the firmware is to execute the memory reference code in response to an operating system initiating a memory detection feature, wherein executing the memory reference code is to recognize a hot-plugged memory.

17. The system of claim 16, wherein the cache is used as a random access memory to support executing the memory reference code in the cache during a boot-up phase.

18. The system of claim 17, wherein a pre-extensible interface phase of the firmware is to provide information of the memory and the pointer to the memory reference code as a hand-off-block list, wherein the hand-off-block list is provided to a driver execution phase.

19. The system of claim 16, wherein the operating system is to initiate the memory detection feature in a run-time phase, wherein the memory detection feature is to initiate a dynamic memory detection driver, wherein the dynamic memory detection driver is to cause execution of the memory reference code in the memory.

20. The system of claim 19, wherein the execution of the memory reference code in the run-time phase generates a new memory map, wherein the new memory map comprises a map of the hot-plugged memory.

* * * * *